(12) United States Patent
Lu et al.

(10) Patent No.: US 7,857,296 B2
(45) Date of Patent: Dec. 28, 2010

(54) HINGE POSITIONING APPARATUS

(75) Inventors: Li-Chin Lu, Taipei Hsien (TW);
Jian-Hua Xiang, Shenzhen (CN);
Yue-Song Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 444 days.

(21) Appl. No.: 12/139,510

(22) Filed: Jun. 16, 2008

(65) Prior Publication Data
US 2009/0165247 A1 Jul. 2, 2009

(30) Foreign Application Priority Data
Dec. 27, 2007 (CN) .................. 2007 1 0203483

(51) Int. Cl.
*B23Q 3/00* (2006.01)
(52) U.S. Cl. .................. 269/315; 269/311; 269/313; 269/314; 269/900; 29/281.1
(58) Field of Classification Search .................. 269/315, 269/303, 47, 289 R, 302.1, 291, 58, 309–314, 269/900, 37.91; 29/281.1
See application file for complete search history.

(56) References Cited

U.S. PATENT DOCUMENTS

| | | | | | |
|---|---|---|---|---|---|
| 6,003,851 | A | * | 12/1999 | Araki et al. | 269/239 |
| 6,039,312 | A | * | 3/2000 | Morghen | 269/47 |
| 6,109,602 | A | * | 8/2000 | Schron et al. | 269/216 |
| 6,752,391 | B1 | * | 6/2004 | Euker | 269/289 R |
| 7,618,028 | B2 | * | 11/2009 | Huisken et al. | 269/63 |
| 7,815,177 | B2 | * | 10/2010 | Holliger | 269/37 |
| 2009/0165247 | A1 | * | 7/2009 | Lu et al. | 16/337 |

* cited by examiner

*Primary Examiner*—Lee D Wilson
(74) *Attorney, Agent, or Firm*—Frank R. Niranjan

(57) ABSTRACT

A hinge positioning apparatus includes a base, a first positioning unit, and a second positioning unit. The first positioning unit includes a load-supporting platform, a first locking mechanism, and a plurality of limiting blocks. The load-supporting platform is mounted on the base. The first locking mechanism is movable between a loose position and a locking position. The limiting blocks respectively mounted on the load-supporting platform and the first locking mechanism. The second positioning unit includes two coaxial supports and two second locking mechanism. The supports are mounted on the base adjacent the load-supporting platform, each defines a positioning groove in side surface facing the load-supporting platform. The second locking mechanism are mounted on the supports respectively, configured for maintaining hinges in the positioning grooves. The apparatus is used to position two hinges coaxially on an enclosure of a notebook computer.

14 Claims, 5 Drawing Sheets

HINGE POSITIONING APPARATUS

BACKGROUND

1. Technical Field

The present invention generally relates to positioning apparatuses, especially to a hinge positioning apparatus.

2. General Background

It is well known that a notebook computer includes a main unit and a display unit. The main unit and the display unit are connected to each other by a pair of hinges. The pair of hinges must be coaxial to each other, otherwise the display unit can not rotate smoothly relative to the main unit. When assembling the notebook computer, an operator can not makes the pair of hinges coaxial to each other easily without help of tools.

Thus, what is needed is a hinge positioning apparatus which makes two hinges coaxial to each other.

SUMMARY

A hinge positioning apparatus is disclosed. The hinge positioning apparatus includes a base, a first positioning unit, and a second positioning unit. The first positioning unit includes a load-supporting platform, a first locking means, and a plurality of limiting blocks. The load-supporting platform is mounted on the base. The first locking means is movable between a loose position and a locking position. The limiting blocks respectively mounted on the load-supporting platform and the first locking means. The second positioning unit includes two coaxial supports and two second locking means. The supports are mounted on the base adjacent the load-supporting platform, each defines a positioning groove in side surface facing the load-supporting platform. The second locking means are mounted on the supports respectively, configured for keeping hinges in the positioning grooves.

Further features and advantages will be provided or will become apparent in the course of the following detailed description of exemplary embodiments when taken in conjunction with the accompanying drawings.

BRIEF DESCRIPTION OF THE DRAWINGS

The components of the drawings are not necessarily drawn to measuring scale, the emphasis instead being placed upon clearly illustrating the principles of the hinge positioning apparatus. Moreover, in the drawings, like reference numerals designate corresponding parts throughout the several views.

DETAILED DESCRIPTION OF THE EMBODIMENTS

Figure 1:
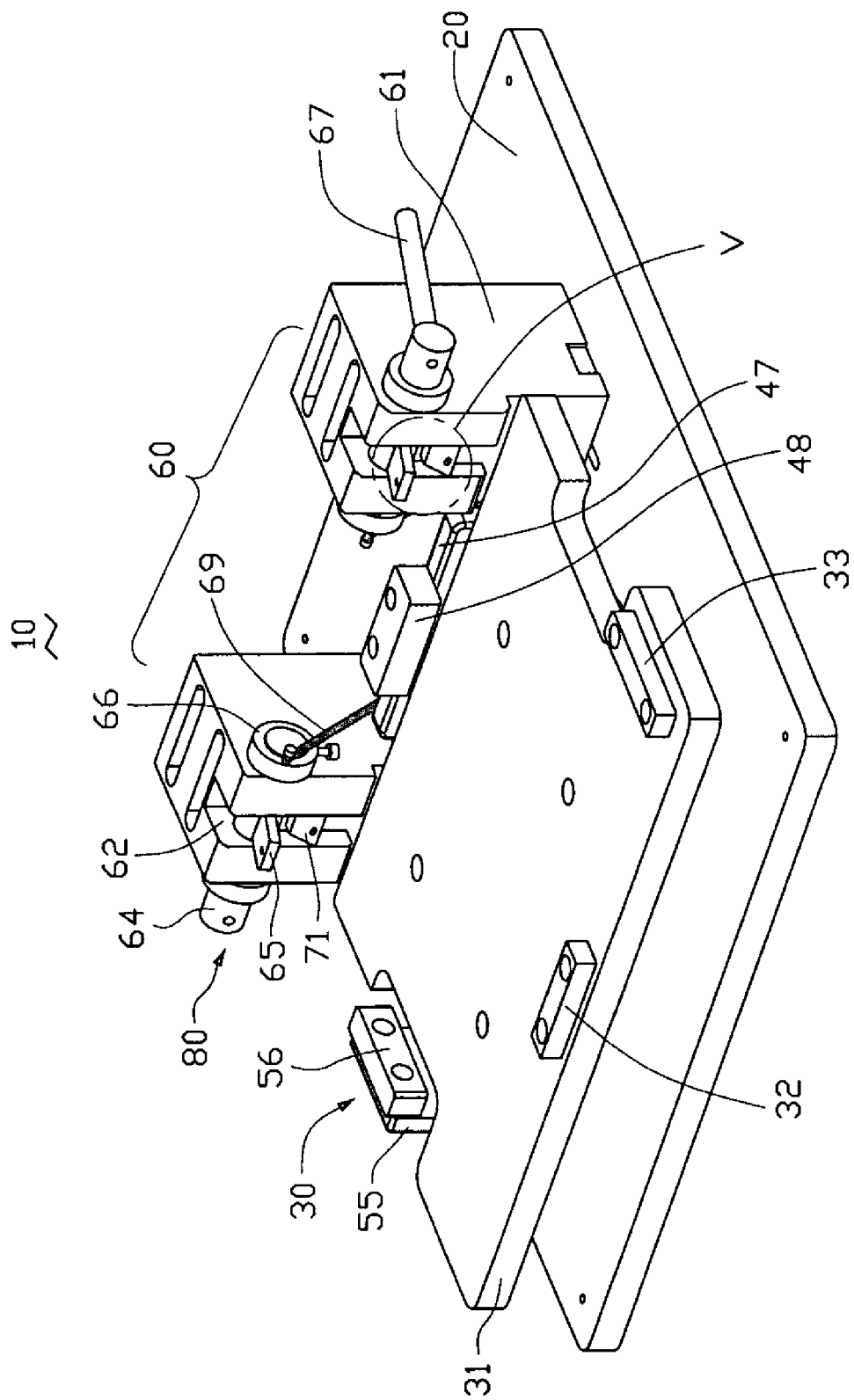
FIG. 1 is an isometric view of a hinge positioning apparatus according to an exemplary embodiment of the present invention.
Figure 2:
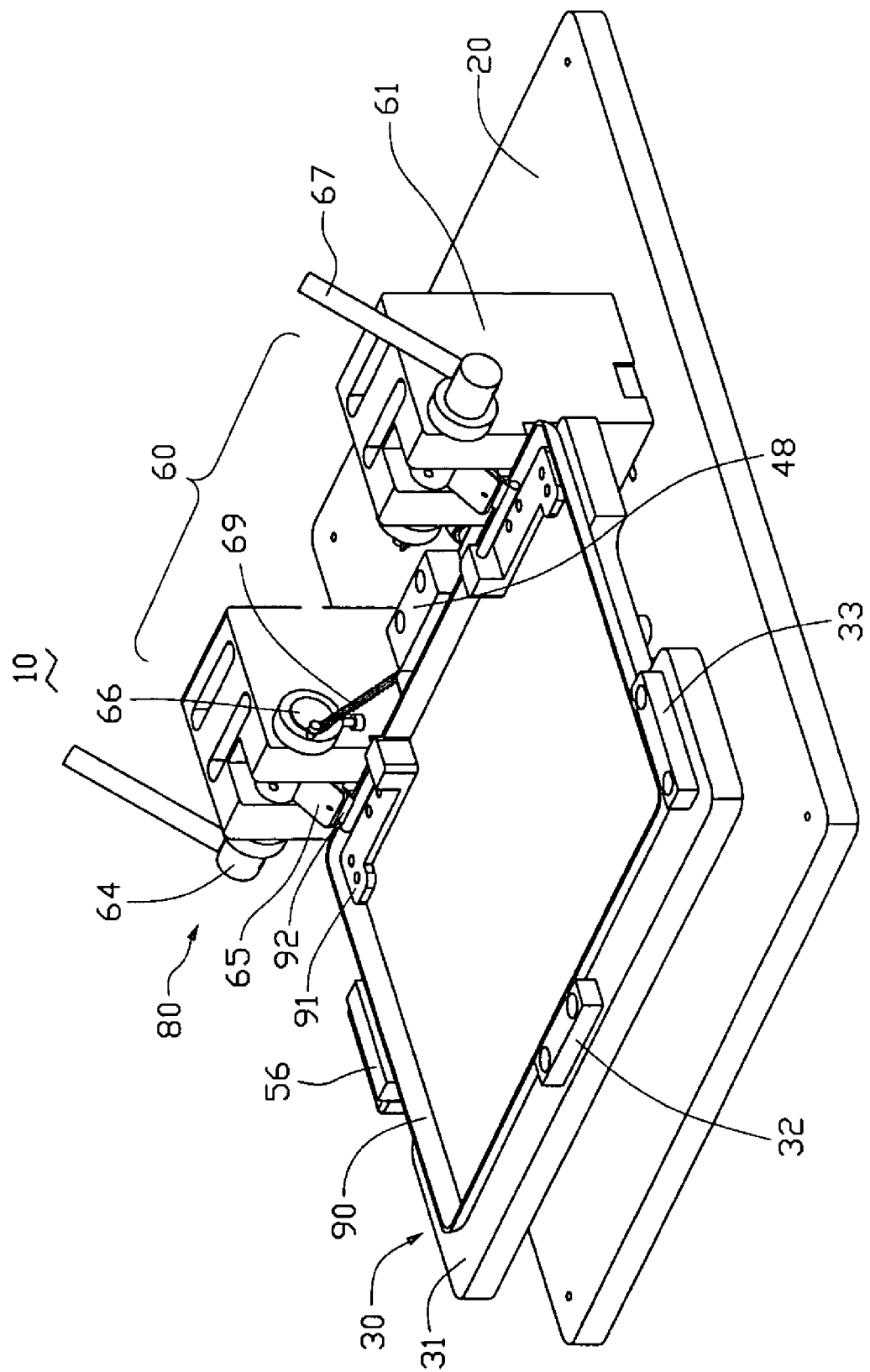
FIG. 2 is an isometric view of the hinge positioning apparatus of FIG. 1 in use.

Referring to FIGS. 1 and 2, a hinge positioning apparatus 10 according to an exemplary embodiment of the present invention is disclosed. The hinge positioning apparatus includes a rectangle shaped base 20, a first positioning unit 30, and a second positioning unit 60, which are mounted on the base 20 respectively. The first positioning unit 30 is configured for positioning an enclosure 90 of a notebook computer. The second positioning unit 60 is configured for positioning a pair of hinges 91 of the notebook computer.

Figure 3:
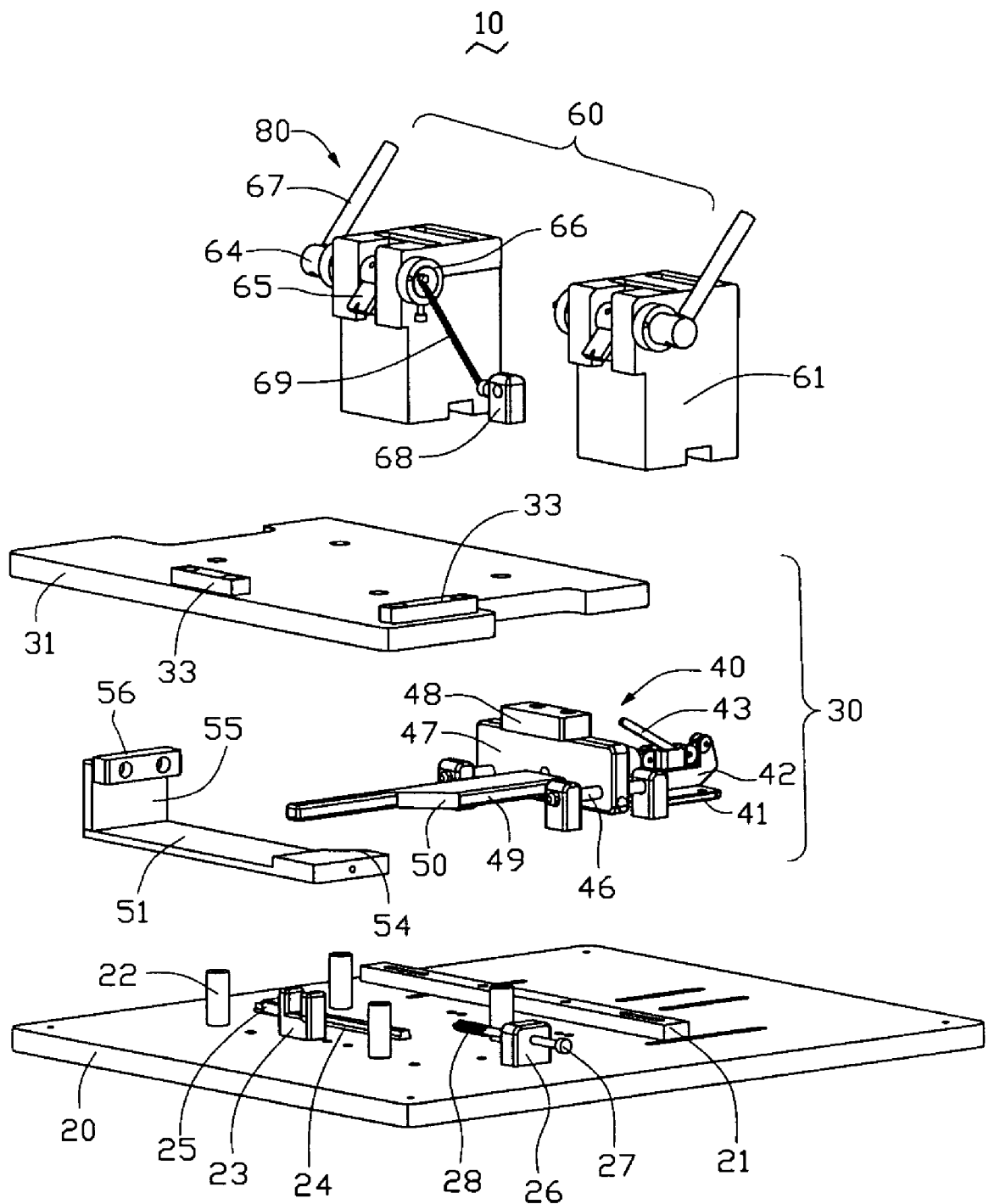
FIG. 3 is an exploded view of the hinge positioning apparatus of FIG. 1.
Figure 4:
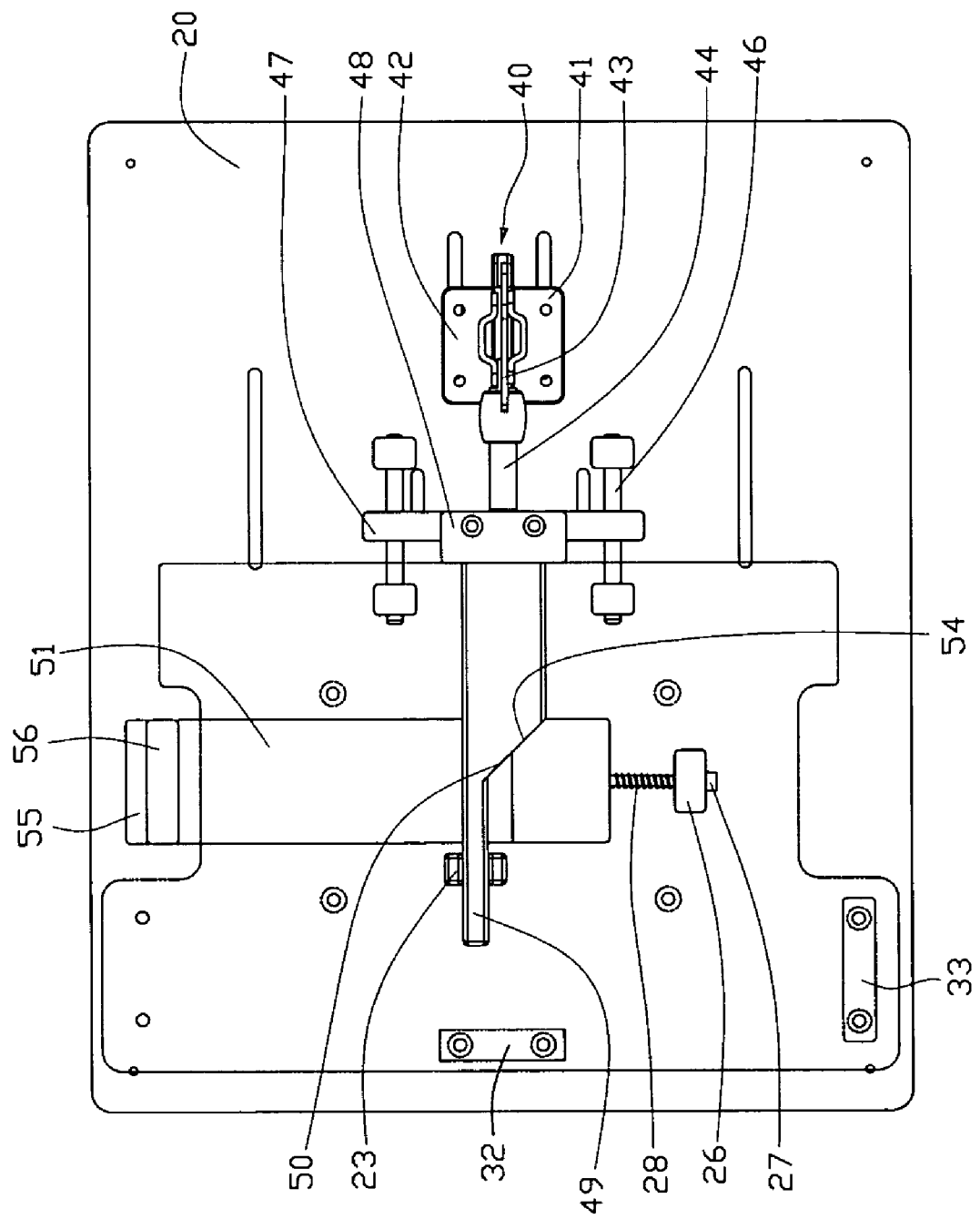
FIG. 4 is a top view of the hinge positioning apparatus of FIG. 1 without a second positioning unit.
Figure 5:
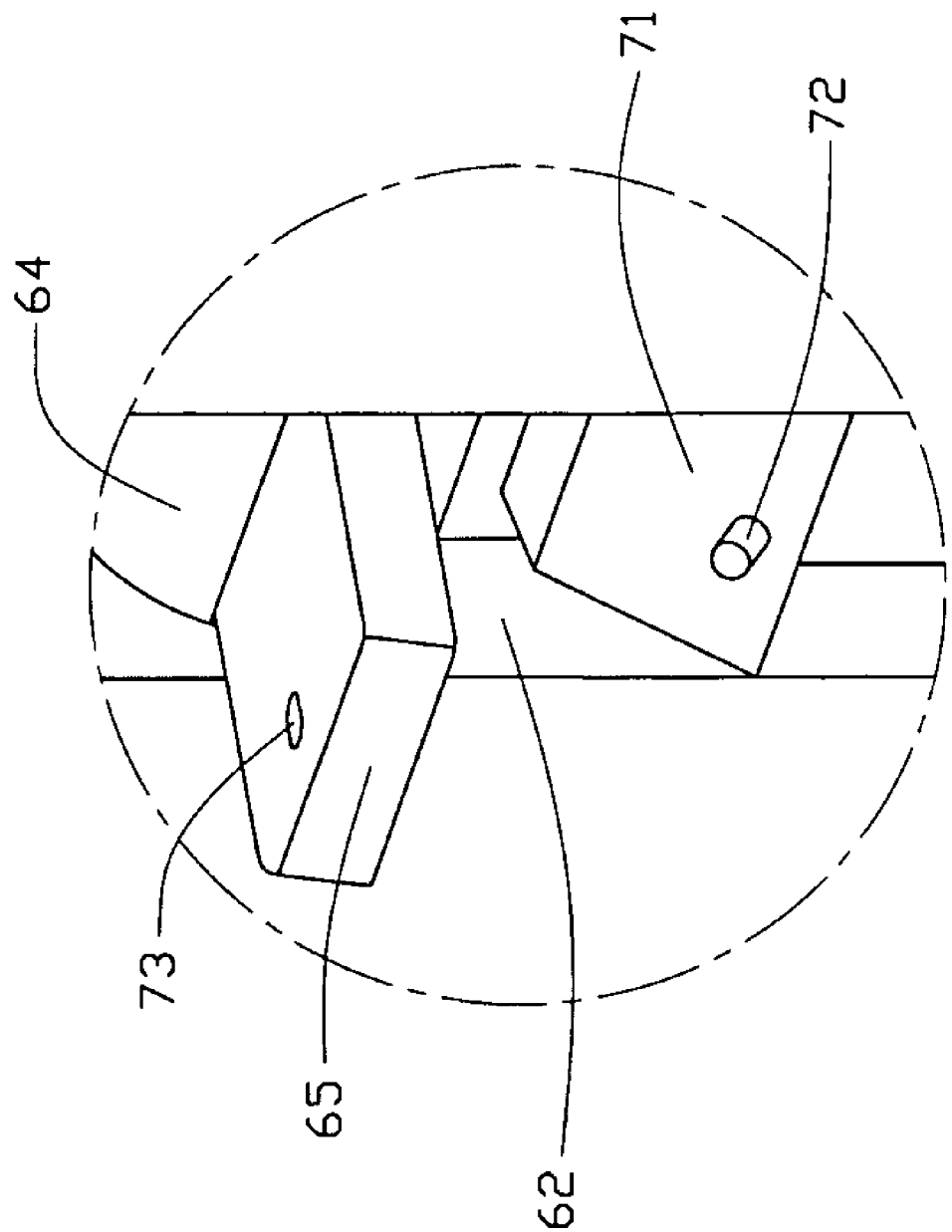
FIG. 5 is an enlarged view of part V of FIG. 1.

Referring to FIGS. 2, 3 and 4, the first positioning unit 30 includes a load-supporting platform 31, a first locking means 40, and a plurality of limiting blocks 32, 33, 48 and 56. The load-supporting platform 31 is mounted on the base 20 and is configured for supporting the enclosure 90. In this embodiment, the load-supporting platform 31 is mounted above the base 20 via supporting posts 22, thus allowing the first locking means 40 to be positioned between the load-supporting platform 31 and the base 20.

The limiting blocks 32 and 33 are mounted on the load-supporting platform 31. The limiting blocks 48 and 56 are mounted on the first locking means 40. The first locking means 40 is movable between a locking position (shown in FIG. 2) and a loose position. In this embodiment, the locking position and the loose position are around the load-supporting platform 31. When the first locking means 40 is in the loose position, the limiting blocks 48 and 56 are at a predetermined distance from the load-supporting platform 31, the enclosure 90 can be disposed on the load-supporting platform 31, or removed from the load-supporting platform 31. When the first locking means 40 is in the locking position, the limiting blocks 48 and 56 are abuts the load-supporting platform 31, thus confining the enclosure 90 on the load-supporting platform 31. In other embodiment, the hinge positioning apparatus 10 can have a big platform 31, and the locking position and the loose position can be on the platform 31.

The first locking means 40 includes a quick-action clamp 41, a middle sheet 47, a transmission sheet 49, and an aligning sheet 51. The quick-action clamp 41, mounted on the base 20, includes a main body 42, a slidable shaft 44, and a handle 43. The quick-action clamp 41 drives the middle sheet 47 slidably supported by a pair of sliding bar 46 that is fixed on the base 20. The limiting block 48 is mounted on a top surface of the middle sheet 47. When the quick-action clamp 41 is actuated, it drives the middle sheet 47 together with the limiting block 48 to slide to the loose position or the locking position.

The transmission sheet 49 is positioned between the load-supporting platform 31 and the base 20. One end of the transmission sheet 49 is connected to the middle sheet 47. A U-shaped supporting block 23 moveably supports the other end of the transmission sheet 49. The transmission sheet 49 includes a side surface 50. The side surface 50 is tilted relative to a moving direction of the transmission sheet 49.

The aligning sheet 51 projects upwardly at a first end, and includes a side surface 54 adjacent to the first end. A fixing block 26 is mounted on the base 20 adjacent to the first end of the aligning sheet 51. An adjustable peg 27 connects the fixing block 26 to the aligning sheet 51 and is configured with a spring 28 for pushing the side surface 54 of the aligning sheet 51 against the side surface 50 of the transmission sheet 49. Thus, a movement of the transmission sheet 49 will cause a movement of the aligning sheet 51. The aligning sheet 51 is configured for sliding along a sliding guide 24 mounted on the base 20 and perpendicular to the moving direction of the transmission sheet 49.

A side wall 55 is connected to the aligning sheet 51 at a second end. The side wall 55 is higher than the load-supporting platform 31. The limiting block 56 extends from the side wall 55.

When the quick-action clamp 41 is actuated, the quick-action clamp 41 drives the middle sheet 47 to move to the loose position or the locking position with the limiting block 48. Correspondingly, the transmission sheet 49 connected to the middle sheet 47 drives the aligning sheet 51 with the limiting block 56 to moves to the loose position or the locking position.

The structure of the first locking means 40 is not limited by the disclosure of the present embodiment. For example, two quick-action clamps 41 can be used to drive the transmission sheet 49 and the aligning sheet 51 respectively, or a motor can be used to replace the quick-action clamp 41.

Referring to FIGS. 1, 2, 3, and 5, the second positioning unit 60 includes two supports 61 mounted on the base 20. Located by a shaft 21, the two supports 61 are coaxial to each other.

Each of the supports 61 defines a positioning groove 62 in a side surface facing the load-supporting platform 31. The positioning groove 62 includes an inclined positioning surface 71. A positioning rod 72 protrudes from the positioning surface 71.

A second locking means 80 is mounted on a top portion of the support 61. The second locking means 80 is configured for cooperating with the positioning surface 71, thus to keep a loose leaf 92 of the hinge 91 in the positioning groove 62. In this embodiment of the present invention, the second locking means 80 includes a pivot shaft 64, a cover 65, a handle 67, and an elastic piece 69.

The pivot shaft 64 is rotatably mounted on the support 61 above the positioning surface 71. Two backup rings 66 are mounted on two ends of the pivot shaft 64 correspondingly. The backup rings 66 prevent the pivot shaft 64 from detaching from the support 61. The handle 67 is mounted on an end of the pivot shaft 64. The cover 65 is fixed with the pivot shaft 64 in the positioning groove 62. The cover 65 defines a hole 73 for receiving the positioning rod 72. The cover 65 is rotatable to open from or close to the positioning surface 71. Two ends of the elastic piece 69 are correspondingly fixed on the base 20 via a block 68 and on one backup ring 66. The elastic piece 69 maintains the cover 65 in an open position or a close position.

The second locking means 80 are not limited to the present embodiment. For example, the second locking means 80 can be a magnetic subject mounted in the support 61, thus, the loose leaf 92 is kept in the positioning groove 62 by a magnetic force.

In using the hinge positioning apparatus 10, first, the first locking means 40 is put in the loose position and the cover 65 is put in the open position. Second, the enclosure 90 is placed on the load-supporting platform 31 and is contacted with the limiting blocks 32, 33. Third, the clamp 41 is actuated, thus, driving the first locking means 40 to the locking position so that the limiting blocks 32, 33, 48, 56 cooperatively confine the enclosure 90 on the load-supporting platform 31. Fourth, two hinges 91 are placed on the enclosure 90. Loose leaves 92 of the hinges 91 are positioned in the positioning grooves 62. The positioning rods 72 pass through holes defined in the loose leaves 92 (not shown). Fifth, the handles 67 are rotated to close the covers 65, thus maintaining the hinges 91 in the positioning grooves 62. Sixth, the hinges 91 are fixed on the enclosure 90. Seventh, the cover 65 is opened. The first locking means 40 is driven to the loose position. The enclosure 90 with fixed hinges 91 is taken out from the load-supporting platform 31.

Moreover, it is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A hinge positioning apparatus comprising:
   a base;
   a first positioning unit comprising:
   a load-supporting platform mounted on the base;
   a first locking means movable between a loose position and a locking position; and
   a plurality of limiting blocks respectively mounted on the load-supporting platform and the first locking means; and
   a second positioning unit comprising:
   two coaxial supports mounted on the base adjacent to the load-supporting platform, each defining a positioning groove in side surface thereof facing the load-supporting platform; and
   two second locking means mounted on the supports respectively, configured for keeping hinges in the positioning grooves.

2. The hinge positioning apparatus of claim 1, wherein the locking position and the loose position are around the load-supporting platform.

3. The hinge positioning apparatus of claim 1, wherein the locking position and the loose position are on the load-supporting platform.

4. The hinge positioning apparatus of claim 1, wherein the first locking means comprises a quick-action clamp, a transmission sheet, and an aligning sheet, the quick-action clamp being capable of driving the transmission sheet to move, and the transmission sheet being capable of driving the aligning sheet to move along a direction perpendicular to a moving direction of the transmission sheet.

5. The hinge positioning apparatus of claim 4, wherein the transmission sheet and the aligning sheet define side surface against each other and tilted relative to the moving direction of the transmission sheet.

6. The hinge positioning apparatus of claim 5, further comprising a spring connected with the aligning sheet and pushing the aligning sheet to against the transmission sheet.

7. The hinge positioning apparatus of claim 4, wherein the transmission sheet and the aligning sheet connect with one of the plurality of limiting blocks respectively.

8. The hinge positioning apparatus of claim 1, wherein the first locking means comprises a motor, a transmission sheet, and an aligning sheet, the motor being capable of driving the transmission sheet to move, and the transmission sheet being capable of driving the aligning sheet to move along a direction perpendicular to a moving direction of the transmission sheet.

9. The hinge positioning apparatus of claim 1, wherein the positioning groove comprises an inclined positioning surface.

10. The hinge positioning apparatus of claim 9, further comprising a positioning rod protruding from the positioning surface.

11. The hinge positioning apparatus of claim 10, wherein the second locking means comprises a pivot shaft mounted above the positioning surface, a cover mounted on the pivot shaft, a handle for rotating the pivot shaft to make the cover open from or close to the positioning surface, and an elastic piece for maintaining the cover in a opened position or in a closed position.

12. The hinge positioning apparatus of claim 11, wherein the cover defines a hole for receiving the positioning rod.

13. The hinge positioning apparatus of claim 9, wherein the second locking means comprises a pivot shaft mounted above the positioning surface, a cover mounted on the pivot shaft, a handle for rotating the pivot shaft to make the cover open from or close to the positioning surface, and an elastic piece for maintaining the cover in a opened position or in a closed position.

14. The hinge positioning apparatus of claim 1, wherein the second locking means are magnetic.

* * * * *